United States Patent [19]

Aoi

[11] Patent Number: 5,539,720
[45] Date of Patent: Jul. 23, 1996

[54] METHOD AND APPARATUS FOR DRIVING LIGHT SOURCE BY STORED CURRENT VALUE AND FOR PROCESSING INFORMATION

[75] Inventor: Shigeru Aoi, Kawasaki, Japan

[73] Assignee: Canon Kabushiki Kaisha, Tokyo, Japan

[21] Appl. No.: 109,112

[22] Filed: Aug. 17, 1993

Related U.S. Application Data

[63] Continuation of Ser. No. 418,557, Oct. 10, 1989, abandoned.

[30] Foreign Application Priority Data

Oct. 11, 1988 [JP] Japan .................................. 63-256318

[51] Int. Cl.$^6$ ...................................................... G11B 7/00
[52] U.S. Cl. .......................................... 369/116; 369/100
[58] Field of Search .................................. 369/54, 58, 59, 369/100, 106, 110, 116, 124, 111, 121, 122; 346/762; 235/454, 438

[56] References Cited

U.S. PATENT DOCUMENTS

| | | | |
|---|---|---|---|
| 4,375,067 | 2/1983 | Kitamura | 346/160 |
| 4,509,156 | 4/1985 | Oharu et al. | 369/54 |
| 4,747,091 | 5/1988 | Doi | 369/116 |
| 4,894,817 | 1/1990 | Tanaka et al. | 235/454 X |
| 4,907,212 | 3/1990 | Pharris et al. | 369/54 |
| 4,989,198 | 1/1991 | Kojima et al. | 369/116 |
| 4,998,234 | 3/1991 | Rees et al. | 369/124 |
| 5,005,164 | 4/1991 | Sakamoto et al. | 369/59 |
| 5,070,495 | 12/1991 | Bletscher et al. | 369/116 |
| 5,113,384 | 5/1992 | McDonald et al. | 369/54 |

OTHER PUBLICATIONS

Patent Abstracts of Japan, Nov. 18, 1986, vol. 10, No. 341, Kokai No. 61-142,538, Jun. 1986.
Patent Abstracts of Japan, Mar. 28, 1987, vol. 11, No. 100, Kokai No. 61-250,849, Nov. 1986.

*Primary Examiner*—Nabil Z. Hindi
*Attorney, Agent, or Firm*—Fitzpatrick, Cella, Harper & Scinto

[57] ABSTRACT

An optical information processing method according to the present invention includes a first step of supplying a driving current to a light source so as to emit a light beam, a second step of converging the light beam emitted from the light source and irradiating the converged light beam onto an optical recording medium, a third step of adjusting a focal point of the light beam on the medium, a fourth step of adjusting the driving current so that the power of the light beam is set to a predetermined value in a state in which the focal point was adjusted a fifth step of storing the value of the driving current which was adjusted in the fourth step, and a sixth step of supplying the current of the value stored in the fifth step to the light source so as to emit the light beam and scanning the medium by the light beam, and thereby recording, reproducing, or erasing information. An apparatus to embody the above method is also disclosed.

17 Claims, 4 Drawing Sheets

METHOD AND APPARATUS FOR DRIVING LIGHT SOURCE BY STORED CURRENT VALUE AND FOR PROCESSING INFORMATION

This application is a continuation of prior application Ser. No. 07/418,557 filed Oct. 10, 1989, now abandoned.

BACKGROUND OF THE INVENTION

1. Field of the Invention

The present invention relates to an optical information processing method and apparatus in which a light beam emitted from a light source is converged and irradiated onto an optical recording medium, thereby executing at least one of recording, reproducing, and erasing operations of information.

2. Related Background Art

Hitherto, as large capacity memories which are used in computers or the like, an optical card apparatus which can record and reproduce information, an optical disk apparatus, a magneto optical disk apparatus which can record, reproduce, and erase information, and the like have been known. In the above apparatuses, recording and the like are also executed by irradiating the light beam emitted from the light source onto an optical recording medium. At this time, an output power of a semiconductor laser or the like which is used as a light source fluctuates in association with environmental changes in temperature and the like even when a predetermined current is input. Therefore, in an apparatus disclosed in, for instance, U.S. Pat. No. 4,509,156, what is called an automatic power control (APC) in which an output power of a light source is detected upon reproduction and the result of the detection is fed back to the light source to thereby keep the output power constant is executed. On the other hand, in such an apparatus, upon recording, an input current value by the APC in the reproducing mode is held, the current of an amount corresponding to an increase in power which is necessary to record is added to the current held, and the resultant added current is supplied to the light source.

However, in the above APC, a certain extent of time period is necessary until the output power of the light source becomes stable. Therefore, in a case when the output power of the light source must be switched at a high speed, for instance, the powers of the light beam which are necessary to record or the like on an inner track portion and an outer track portion of, for instance, an optical disk differ and, further, in a case when random access of the light beam is executed in the region between those portions, the APC cannot sufficiently cope with such a case.

On the other hand, to solve the above inconvenience of the APC, there has been proposed an apparatus in U.S. Pat. No. 4,747,091 in which a light source is experimentally driven to emit the light prior to executing the recording operation or the like, the relation between a driving current of the light source and an output power is previously measured, and the result of the measurement is stored. According to such an apparatus, upon operation, the APC is not initially executed but a current of the stored value is supplied to the light source, thereby realizing a prompt switching of the light power.

However, in the measurement by the apparatus disclosed in U.S. Pat. No. 4,747,091, an accurate result is not always obtained. This is because different from the measuring mode, in the recording operation or the like, the light beam has been converged onto a medium and its reflected light is returned to the light source and an output of the light source is changed by the returned reflected light. That is, in the apparatus of U.S. Pat. No. 4,747,091, there is a concern of on occurrence of a difference of the relations between the driving current and the light power upon measurement before the operation and upon actual measurement.

SUMMARY OF THE INVENTION

It is an object of the present invention to solve the problems of the conventional techniques and to provide an optical information processing method and apparatus in which an output power of a light source can be accurately adjusted at a high speed.

The above object of the invention is accomplished by an optical information processing method comprising:

a first step of supplying a driving current to a light source so as to emit a light beam;

a second step of converging the light beam emitted from the light source and irradiating the converged light beam onto an optical recording medium;

a third step of adjusting a focal point of the light beam on the medium;

a fourth step of adjusting the driving current so that the power of the light beam is set to a predetermined value in a state in which the focal point was adjusted;

a fifth step of storing the value of the driving current which was adjusted in the fourth step; and a sixth step of supplying the current of the value stored in the fifth step to the light source so as to emit the light beam and scanning the medium by the light beam, and thereby recording, reproducing, or erasing information.

On the other hand, an apparatus to embody the above method comprises:

a light source to emit a light beam;

a current source to supply a driving current to the light source;

a servo circuit to adjust a focal point of the light beam on a medium;

a detector to detect a power of the light beam which is emitted from the light source;

an automatic power control circuit to control the driving current which is supplied to the light source in accordance with an output from the detector so that the power of the light beam is set to a predetermined value;

a memory to store a value of the driving current supplied to the light source in a state in which the light beam of the predetermined power was irradiated onto the medium and the focal point was adjusted; and a controller for supplying the current of the value stored in the memory to the light source so as to emit the light beam, and for recording, reproducing, or erasing information.

DETAILED DESCRIPTION OF THE PREFERRED EMBODIMENT

Figure 1:
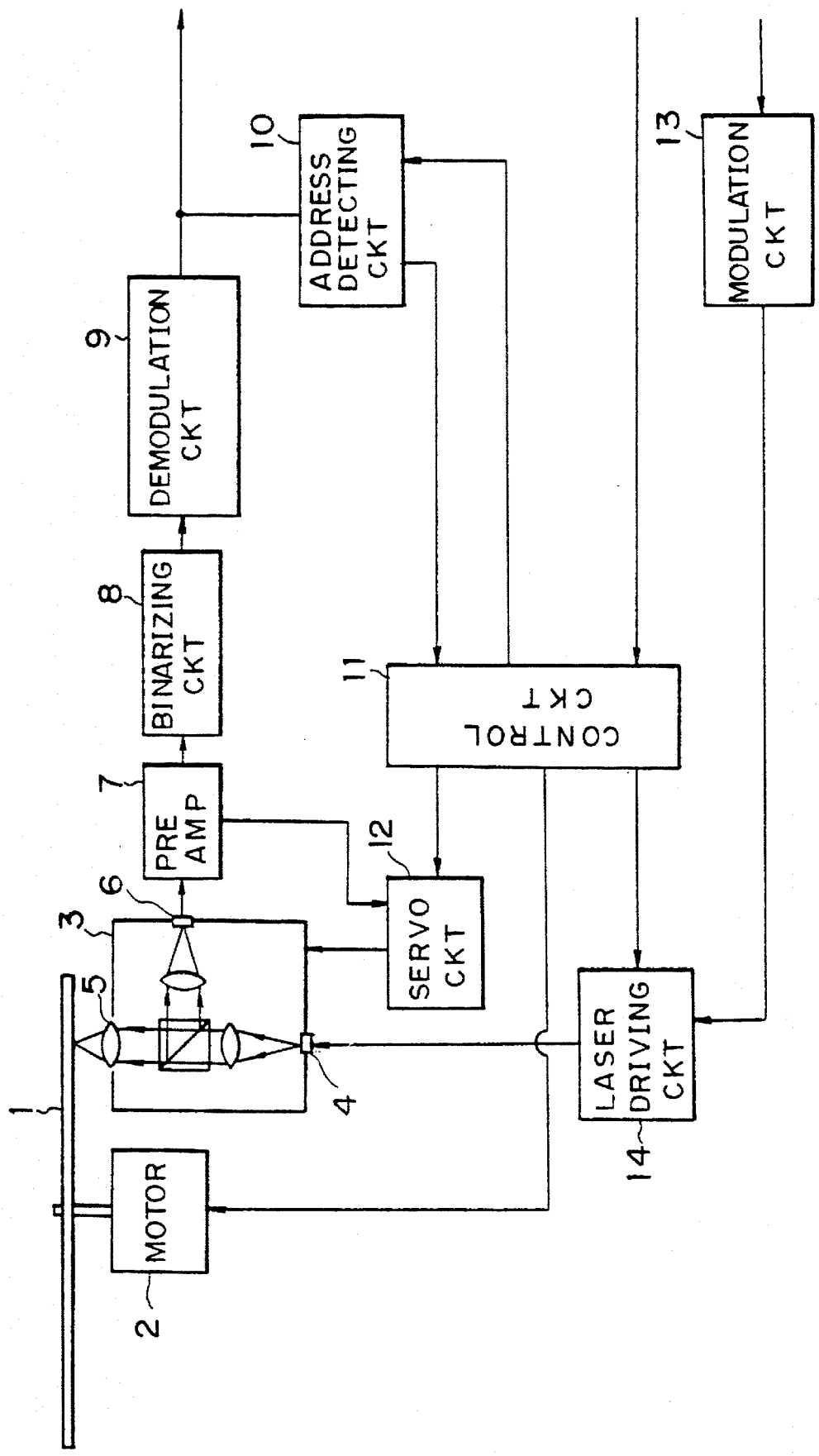
FIG. 1 is a block diagram showing a construction of an embodiment of an optical information processing apparatus of the invention.
Figure 2:
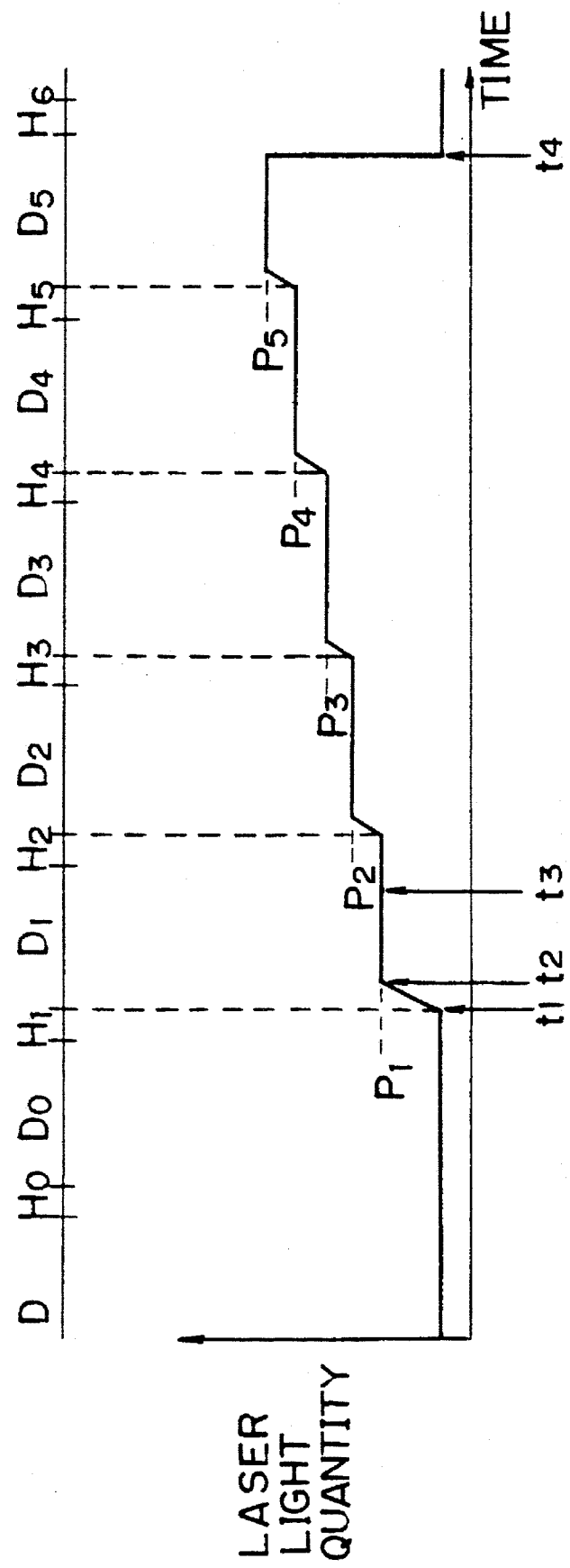
FIG. 2 is a diagram for explaining a state of adjustment of a laser light quantity in the apparatus shown in FIG. 1.
Figure 3:
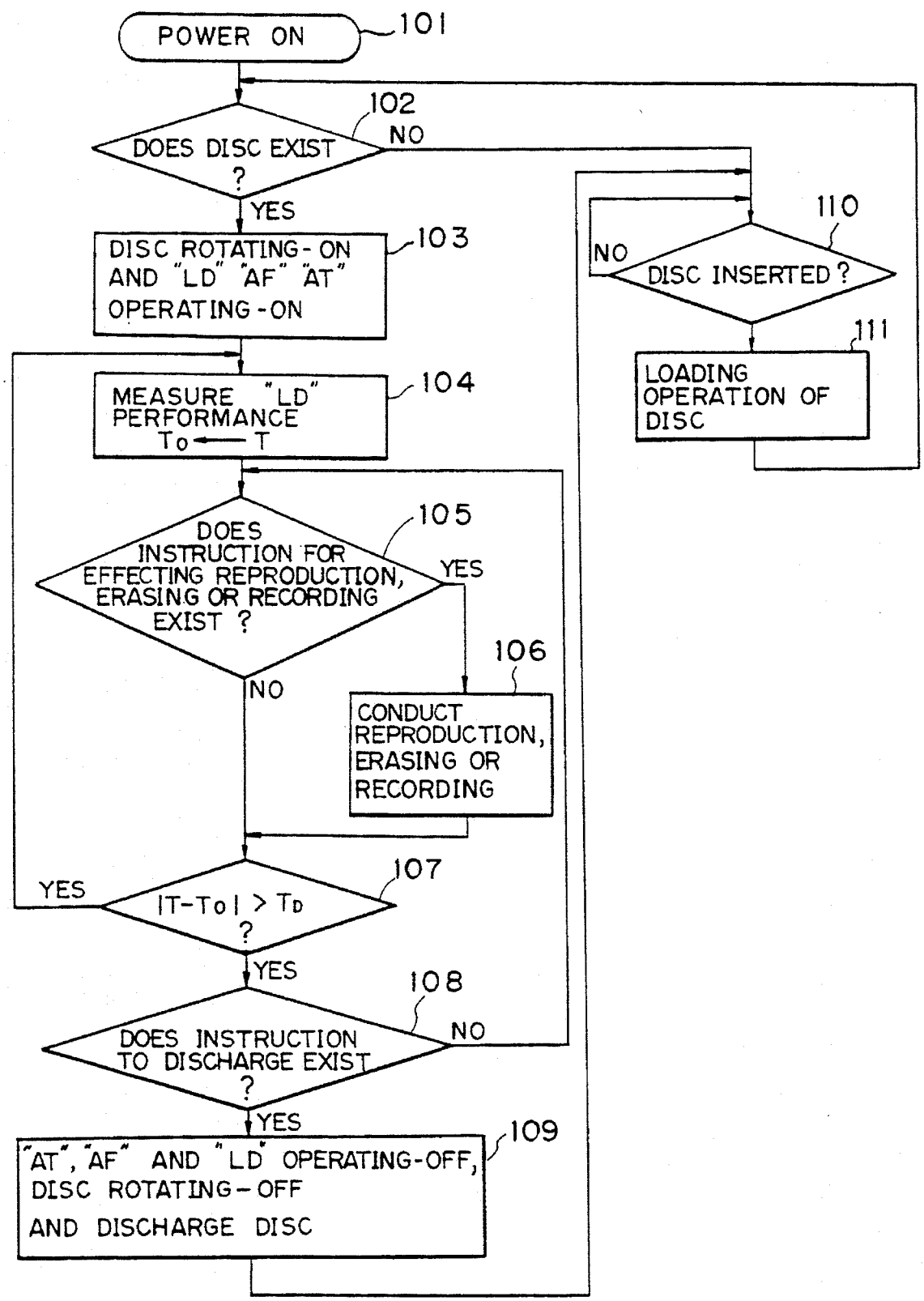
FIGS. 3 and 4 are flowcharts showing the operating steps of the apparatus shown in FIG. 1, respectively.
Figure 4:
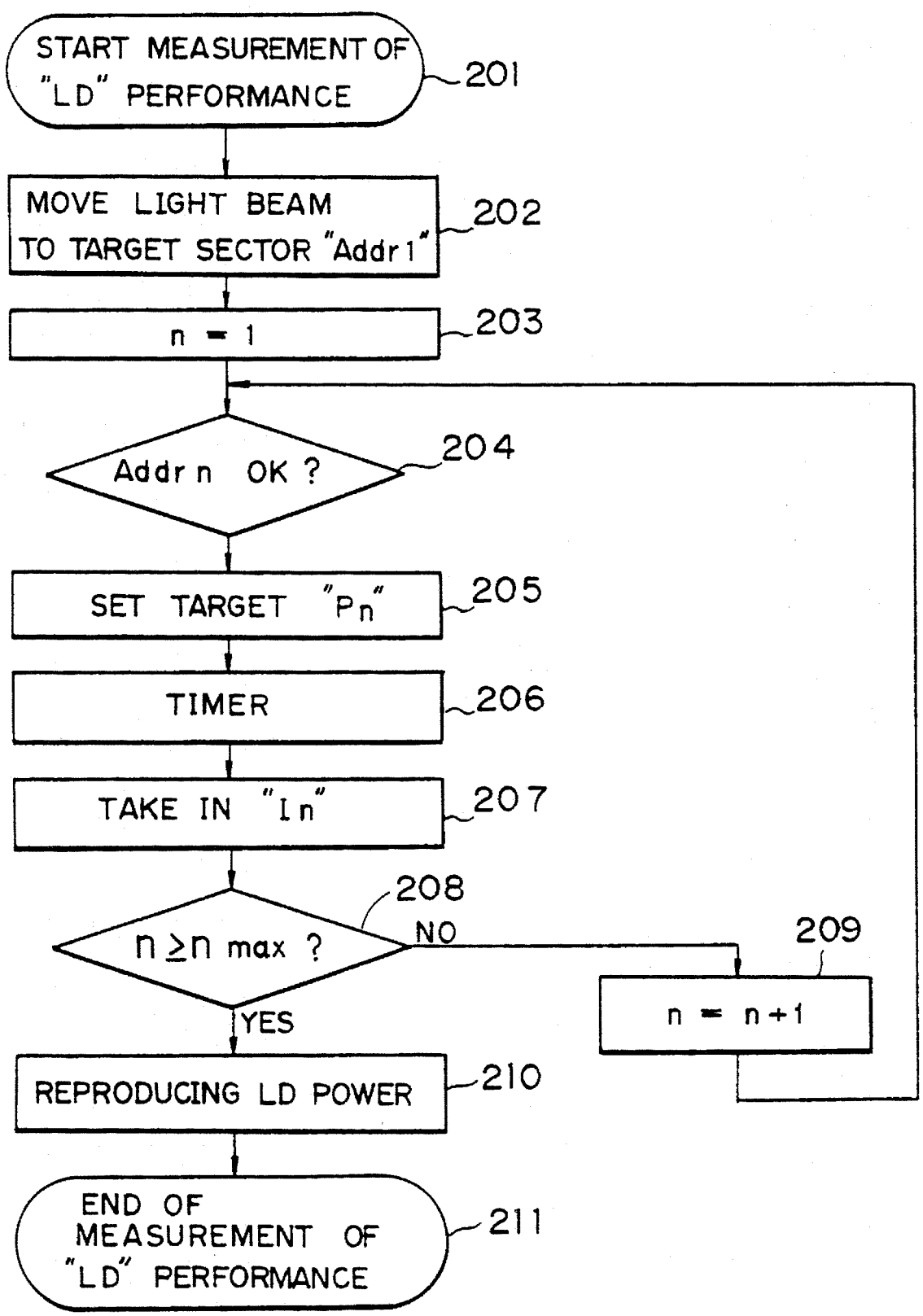

FIG. 1 is a block diagram showing a construction of an embodiment of an optical information processing apparatus of the invention. FIG. 2 is a diagram showing a state of measurement of a laser light quantity in the apparatus shown in FIG. 1. FIGS. 3 and 4 are flowcharts showing the measuring steps.

In FIG. 1, reference numeral 1 denotes a disk of an optical information recording medium. The disk 1 is rotated by a motor 2. The light emitted from a semiconductor laser 4 is focused onto the disk 1 by an objective lens 5. The light reflected by the disk 1 again passes through the objective lens 5 and is photoelectrically converted by a sensor 6 and amplified by a preamplifier 7. The signal is then separated into a focusing error signal, a tracking error signal, and a reproduction information signal by the preamplifier 7. The reproduction information signal is digitized by a binarizing circuit 8 and demodulated to the data signal by a demodulation circuit 9 and is transmitted to a host apparatus. The recording data signal from the host apparatus is input to a modulation circuit 13 and transferred to a laser driving circuit 14 and drives the laser 4. The tracking error signal and the focusing error signal which were output from the preamplifier 7 are input to a servo circuit 12. A focusing error and a tracking error of an optical head 3 are controlled on the basis of the tracking error signal and focusing error signal. Reference numeral 11 denotes a control circuit of the information recording and reproducing apparatus. The control circuit 11 controls the apparatus on the basis of commands from the host apparatus. An address detecting circuit 10 detects an address of the beam position on the disk from an output of the demodulation cirucit 9.

The laser driving circuit 14 supplies a driving current to the semiconductor laser 4. As disclosed in JP-A-54-10481 and U.S. Pat. No. 4,375,067, the laser driving circuit 14 has a photodetector for receiving the light which is emitted from the back side of the semiconductor laser 4 and for detecting an output power of the laser 4. An output of the photodetector is used to control the power of the laser beam which is emitted from the semiconductor laser to a constant value. That is, the laser driving circuit 14 includes an APC circuit.

The operation of the apparatus shown in FIG. 1 will be described with reference to the flowchart of FIG. 3. When a power source of the apparatus is turned on, although not shown, a check is made to see if a disk has been set in the apparatus or not (step 102). If no disk is set, discrimination to see if the disk has been inserted or not is continuously executed (step 110). After the insertion condition of the disk was detected, the disk is loaded (step 111). If the disk has been set (step 102), the control circuit 11 rotates the disk by the motor 2. If a rotational speed of the disk has reached a stationary value, the control circuit 11 generates a command to the laser driving circuit 14, thereby driving the laser with a reproduction light quantity and executing the focusing control and tracking control by the servo circuit 12 (step 103). Thereafter, the laser performance which will be explained later in FIG. 4 is measured. A temperature of the laser at this time is measured by a thermometer (not shown) and the measured value is set to $T_0$ (step 104). After completion of the measurement of the laser performance, a check is made to see if the reproducing, recording, or erasing operation has been instructed or not (step 105). Each operation is executed on the basis of its command (step 106). The laser temperature is again measured and a check is made by the control circuit 11 to see if the laser temperature at this time has changed or not by the predetermined temperature $T_D$ (in this case, 5° C.) from the temperature when the preceding laser performance was measured or more (step 107). If the temperature has changed by $T_D$ or more, the laser performance is again measured. If the temperature does not change, the control circuit 11 discriminates whether discharge of the disk has been instructed or not (step 108). If NO, a check is again made to see if the reproducing, recording, or erasing operation has been instructed or not. If the disk discharge has been instructed, the control circuit 11 stops the tracking and focusing controls by the servo circuit 12 and outputs a command to the laser driving circuit 14 so as to stop the driving of the laser. The rotation of the disk is stopped and the disk is discharged (step 109). Thereafter, a check is again made to see if a disk has been loaded or not (step 110).

The laser performance is measured in a state in which the focusing and tracking controls are being executed in a predetermined area of the disk and in the data recordable or reproducible portion in which information such as address data or the like is not recorded. This is because a return light quantity to the laser is set to the same condition as that in the case of actually recording or erasing data. When the return light quantity to the laser changes, the light emitting efficiency of the laser changes and the laser performance cannot always be accurately measured.

On the other hand, data is not actually recorded in such an area and the data recording is executed while always confirming addresses by a host computer or a controller.

Measurement of the laser performance will now be described with reference to the flowchart of FIG. 4 and FIGS. 1 and 2. When the measurement is started (step 201), the control circuit 11 first sets a head address Addr1 of a predetermined measuring area to the address detecting circuit 10 and drives the optical head 3 by the servo circuit 12, thereby moving the light beam to the target address Addr1 (step 202). Next, n of a measurement step calculating register is set to 1 (step 203). A wait is made until the address is set to Addr1. In the signal reproduction of the header portion of $H_1$, if the address is set to Addr1, an address coincidence signal is output from the address detecting circuit 10 and if the address coincidence signal has been detected (step 204), at time $t_1$ in FIG. 2, a control target power of the laser beam of the control circuit is set to a light output of $P_1$ (step 205). The laser driving circuit 14 monitors the power of the laser beam and controls the driving current so as to become a predetermined power. The laser driving circuit 14 responds and the light power is set to $P_1$ at time $t_2$. At this time, a timer of a time larger than $t_1-t_2$ is made operative (step 206). The driving current is stored into a memory (not shown) provided in the control circuit 11 at time $t_3$ after the light power was sufficiently stabilized and before the address area is set to the address area of the next sector (step 207). Such a portion exists in a data area of $D_1$. Thereafter, the value of n is increased one by one (step 209). In this example, $n_{max}$ is set to 5 and the target light power is set to five stages and the driving current of the semiconductor laser when each power being output is stored into the memory.

Finally, the output of the semiconductor laser is returned to the reproducing power (step 210). The measurement of the laser performance is finished (step 211).

A range of the light output of five stages is set so as to satisfy a range of the light output which is necessary when the temperature of the disk and the relative speed between the medium and the spot at the recording position change. A target value to be set is sequentially changed from the low light power to the high light power. When the value of $I_n$ becomes the maximum value at which the driving circuit can drive, this means that the life of the laser has approached the end, so that there is a possibility that a necessary light power is not obtained. Therefore, when the value of $I_n$ has reached the limit value, the control circuit 11 indicates an error in the laser or informs such a laser error to other apparatus, thereby requesting the user to exchange the laser.

The driving currents corresponding to the target light powers of $P_1$ to $P_5$ are obtained as mentioned above. The target light output is derived by supplying the driving current corresponding to the necessary erasing or recording power to the semiconductor laser on the basis of the value derived from the measurement point. If the light power between the measurement points was requested, the relation between the current and the power is linearly approximated on the basis of the result of the measurement, thereby calculating the driving current corresponding to the requested power.

In the invention, a measured value also can be used as an initial current when executing the APC operation upon recording or erasing. In such a case, the current of the value stored in the memory is first supplied to the semiconductor laser and the APC operation is executed at the stage when the light emission of the laser is stabilized.

In the embodiment, the laser performance has been measured in the DC light-up mode. However, the laser light quantity upon recording is based on the pulse light-up operation and there exists a case wherein a light peak quantity larger than the light quantity upon erasing is necessary. When measuring such a driving current, it is sufficient to measure by pulse lighting up the semiconductor laser. In the case of a laser such that the maximum rated laser outputs in the DC light-up mode and the pulse light-up mode differ, the maximum rated output in the pulse light-up mode is larger than that in the DC light-up mode. Therefore, in the pulse light-up mode, the laser performance can be measured in a range wider than that in the case of the measurement which is executed in the DC light-up mode.

In the case of measuring in the pulse light-up mode, if the frequency of the circuit to monitor the emission light power of the APC loop is lower than the pulse frequency, it is sufficient that the light power corresponding to a predetermined duty ratio of the pulse light-up operation is calculated and the driving current corresponding to the calculated power is measured.

When measuring in the pulse light-up mode, if the header portion is reproduced and the address is checked, it is necessary to set the DC light-up mode. It is desirable to set the light quantity at this time to a low power upon reproduction. Even when measuring in the DC light-up mode, the light quantity also can be set to the light power upon reproduction for a time interval when the light beam is irradiated to the header portion.

In addition to the above-described embodiment, various applications of the invention are possible. For instance, the power of the light beam also can be detected by receiving a part of the light beam directed from the light source to the medium by the photodetector. The invention incorporates all of such applications without departing from the scope of the claims of the invention.

What is claimed is:

1. An optical information recording/reproducing method comprising:

a first step of supplying a driving current to a semiconductor laser to emit a light beam;

a second step of converging the light beam emitted from the semiconductor laser and irradiating the converged light beam onto a predetermined area on an optical recording medium where no information is recorded;

a third step of performing focusing control to adjust focal points of the light beam on the predetermined area of the recording medium;

a fourth step of adjusting the driving current in states in which the focusing control is being performed, while monitoring power of the light beam, to set the power of the light beam to a predetermined value required for recording or reproducing information;

a fifth step of storing a value of the driving current supplied to the semiconductor laser when the power of the light beam is set to the predetermined value in said fourth step; and a sixth step of supplying the driving current having the value stored in said fifth step to the semiconductor laser to emit the light beam, and scanning the recording medium with the light beam to thereby effect one of recording of information on and reproducing of information from the recording medium.

2. A method according to claim 1, wherein further comprising storing, in said fourth and fifth steps, a plurality of driving current values corresponding to a plurality of different values of the power of the light beam, and selecting, in said sixth step, a driving current value corresponding to a required power of the light beam among the plurality of driving current values in accordance with current conditions, to supply the selected driving current value to the semiconductor laser.

3. A method according to claim 1, further comprising executing said fourth and fifth steps when the medium and the light beam are relatively moving.

4. A method according to claim 3, further comprising executing said fourth and fifth steps during execution of tracking control of the light beam to tracks formed on the medium.

5. A method according to claim 1, further comprising irradiating, in said second step, the light beam onto a predetermined area on the medium where no information is recorded.

6. A method according to claim 1, wherein the lit semiconductor laser is pulse light up.

7. A method according to claim 1, further comprising executing said first through fifth steps when a power source of the apparatus is turned on.

8. A method according to claim 1, further comprising executing said first through fifth steps when the medium is being exchanged.

9. A method according to claim 1, further comprising a step of measuring temperature of the semiconductor laser, and wherein said first through fifth steps are executed when the temperature of the light source changes by at least a predetermined value.

10. A method according to claim 1, further comprising a step of comparing the value of the driving current which was adjusted in said fourth step with a predetermined limit value and generating a warning when the current value has reached the limit value.

11. An optical information recording/reproducing apparatus for irradiating a converged light beam onto an optical recording medium and for effecting one of recording of information on and reproducing of information from the recording medium, said apparatus comprising:

a semiconductor laser for emitting the light beam to irradiate a predetermined area on the recording medium where no information is recorded;

a current source for supplying a driving current to said semiconductor laser;

a servo circuit for performing focusing control to adjust focal points of the light beam on the predetermined area of the recording medium;

a detector for detecting power of the light beam emitted from said semiconductor laser in a state in which the focusing control is being performed, and for producing detection outputs;

an automatic power control circuit for controlling driving current supplied to said semiconductor laser in accordance with the outputs of said detector to set the power of the light beam to a predetermined value required for recording or reproducing information;

a memory for storing a value of the driving current supplied to said semiconductor laser when said automatic power control circuit sets the power of the light beam to the predetermined value in the state in which the focal points have been adjusted, wherein said memory stores the value of driving current prior to the recording or reproducing of information; and a controller for supplying the driving current having the value stored in said memory to said semiconductor laser to emit the light beam, to thereby effect one of recording of information on and reproducing of information from the recording medium.

12. An apparatus according to claim 11, wherein said memory stores a plurality of driving current values corresponding to a plurality of different values of the power of the light beam, and selects one of the plurality of driving current values, corresponding to a required power of the light beam in accordance with current conditions, to supply the selected driving current value to said semiconductor laser.

13. An apparatus according to claim 11, further comprising means for executing tracking control of the light beam to tracks formed on the medium.

14. An apparatus according to claim 11, further comprising means for comparing the current value which is input to the memory with a predetermined limit value and for generating a warning when the current value has reached the limit value.

15. An apparatus according to claim 11, further comprising:

means for measuring temperature of said semiconductor laser; and means for updating the current value stored in said memory when the measured temperature has changed by at least a predetermined value.

16. An optical information erasing method comprising:

a first step of supplying a driving current to a semiconductor laser to emit a light beam;

a second step of converging the light beam emitted from the semiconductor laser and irradiating the converged light beam onto a predetermined area on an optical recording medium where no information is recorded;

a third step of performing focusing control to adjust focal points of the light beam on the predetermined area of the recording medium;

a fourth step of adjusting the driving current in states in which the focusing control is being performed, while monitoring power of the light beam, to set the power of the light beam to a predetermined value required for erasing information;

a fifth step of storing the value of the driving current supplied to the semiconductor laser when the power of the light beam is set to the predetermined value in said fourth step; and a sixth step of supplying the driving current having the value stored in said fifth step to the semiconductor laser to emit the light beam, and scanning the recording medium with the light beam to thereby effect erasing of information on the recording medium.

17. An optical information erasing apparatus for irradiating a converged light beam onto an optical recording medium and for erasing information recorded on the recording medium, said apparatus comprising:

a semiconductor laser for emitting the light beam to irradiate a predetermined area on the recording medium where no information is recorded;

a current source for supplying a driving current to said semiconductor laser;

a servo circuit for performing focusing control to adjust focal points of the light beam on the predetermined area of the recording medium;

a detector for detecting power of the light beam emitted from said semiconductor laser in a state in which the focusing control is being performed, and for producing detection outputs;

an automatic power control circuit for controlling the driving current supplied to said semiconductor laser in accordance with the outputs of said detector, to set the power of the light beam to a predetermined value required for erasing information;

a memory for storing a value of the driving current supplied to said semiconductor laser when said automatic power control circuit sets the power of the light beam to the predetermined value in the state in which the focal points have been adjusted, wherein said memory stores the value of the driving current prior to the erasing of information; and a controller for supplying the driving current having the value stored in said memory to said semiconductor laser to emit the light beam, and to thereby effect erasing of information recorded on the recording medium.

* * * * *